United States Patent [19]

Satomi et al.

[11] Patent Number: 4,734,135

[45] Date of Patent: Mar. 29, 1988

[54] METHOD FOR MANUFACTURE OF AQUEOUS SUSPENSION OF SOLID ORGANIC PEROXIDE

[75] Inventors: Nobuyuki Satomi, Aichi; Kazuo Matsuyama, Gamagori; Takeshi Komai, Aichi, all of Japan

[73] Assignee: Nippon Oil & Fats Co., Ltd., Tokyo, Japan

[21] Appl. No.: 536,504

[22] Filed: Sep. 28, 1983

[30] Foreign Application Priority Data

Oct. 12, 1982 [JP] Japan .................. 57-177527

[51] Int. Cl.$^4$ .................. C09K 3/00; C07C 179/00
[52] U.S. Cl. .................. 106/287.23; 106/287.24; 568/558; 568/559
[58] Field of Search .................. 568/559, 558; 106/287.15, 287.23, 287.24

[56] References Cited

U.S. PATENT DOCUMENTS

| | | | |
|---|---|---|---|
| 3,657,312 | 4/1972 | D'Angelo | 260/463 |
| 3,954,880 | 4/1976 | Nakayma et al. | 568/558 |
| 4,092,470 | 5/1978 | Oosterwijk et al. | 568/559 X |
| 4,137,252 | 1/1979 | Komai et al. | 526/230 |
| 4,849,148 | 11/1974 | Temple | 106/287.15 |

FOREIGN PATENT DOCUMENTS

| | | |
|---|---|---|
| 2634131 | 2/1977 | Fed. Rep. of Germany . |
| 51-125302 | 11/1976 | Japan . |
| 54-25992 | 2/1979 | Japan . |
| 56-110702 | 9/1981 | Japan . |
| 57-501085 | 6/1982 | Japan . |

OTHER PUBLICATIONS

Noller et al., "Lucidal Technical Publication", Sep. 12, 1962, Safe Handling & Storage of Organic Peroxides in the Laboratory.

*Primary Examiner*—Theodore Morris
*Attorney, Agent, or Firm*—Oblon, Fisher, Spivak, McClelland & Maier

[57] ABSTRACT

An aqueous suspension of a solid organic peroxide is produced by mixing a solid organic peroxide having a difference of at least 5° C. between the melting point and the thermal decomposition temperature thereof with a protective colloid, a surface active agent, and water thereby forming an aqueous emulsion and subsequently cooling this aqueous emulsion.

8 Claims, No Drawings

METHOD FOR MANUFACTURE OF AQUEOUS SUSPENSION OF SOLID ORGANIC PEROXIDE

BACKGROUND OF THE INVENTION

This invention relates to a method for the manufacture of an aqueous suspension of a solid organic peroxide, and more particularly to a method for safe manufacture of an aqueous suspension of a solid organic peroxide without requiring any special machine for dispersion.

Organic peroxides decompose with cleavage and liberate free radicals. Because of this behavior, organic peroxides are capable of selectively effecting radical polymerization or cross-linking reaction. A concrete example of the former reaction is the (co)polymerization of ethylenically unsaturated monomers such as, for example, vinyl chloride. As a concrete examples of the latter reaction, the cross-linking reaction of polyethylene and ethylene-vinyl acetate copolymer is well known. At normal room temperatures, some of organic peroxides are liquid and others are solid. Examples of organic peroxides which are liquid at normal room temperatures are di-n-propyl peroxydicarbonate and di-2-ethylhexyl peroxydicarbonate. Among the organic peroxides which are used in polymerization ethylenically unsaturated monomers at temperatures not exceeding 60° C., e.g. vinyl chloride, many suffer from inferior storageability. In contrast, those organic peroxides such as, for example, di-cetyl peroxydicarbonate and di-decanoyl peroxide which are solid at normal room temperatures are generally known to excel in storageability and to undergo only slight degradation during protracted storage. On the other hand, such solid organic peroxides have a disadvantage that they are difficult to handle because of their lack of fluidity and they dissolve slowly and are not readily dispersed because of their large particle diameter. Thus, the last few years have seen active work toward the development of aqueous suspensions of solid organic peroxides which retain the merits of solid organic peroxides intact, exhibit high fluidity and solubility, flow smoothly enough to permit conveyance by pumps, and excel in stability. For example Japanese patent Disclosure Sho No. 51(1976)-125302 discloses a method which comprises homogenizing in a three-roll mill a mixture consisting of water, a protective colloid, a surface active agent, and a solid organic peroxide; Japanese patent Disclosure Sho No. 54(1979)-25992 discloses a method which comprises finely dividing a mixture consisting of water, a solid organic peroxide, and a protective colloid in a pulverizer such as a ball mill, hammer mill, or grinder; and Japanese patent Disclosure Sho No. 56(1981)-110702 discloses a method which comprises dispersing a mixture consisting of a protective colloid, a surface active agent, water, and a solid organic peroxide in an Ultraturrax and further homogenizing the resultant dispersion in an ultrasonic homogenizer. Further, Japanese patent Disclosure Sho No. 57(1982)-501085 discloses a method which comprises dispersing a mixture consisting of water, an organic peroxide, a surface active agent, and a protective colloid by passing the mixture into a colloid mill; the specification of West German Pat. No. 2,634,131 discloses a method which comprises dispersing in an ultrasonic homogenizer a mixture consisting of a solid organic peroxide, a protective colloid, and water and the specification of U.S. Pat. No. 3,849,148 discloses a method which comprises mixing a non-ionic surface active agent with a solid organic peroxide at temperature in the range of 60° C. to 66° C., then effecting phase inversion on the resultant emulsion, and subsequently adding water thereto until the temperature of the system falls to the ambient temperature. These methods disclosed by the various publications each entails some demerits. For example, most of the aforementioned methods necessitate special dispersing machines possessing strong shearing stress. Use of such dispersing machines has entails the danger that during pulverization and dispersion, solid organic peroxides will be heated and consequently degraded. The method disclosed by the aforementioned U.S. patent specification has no need for any special device but entails the following demerits. Firstly, since a non-ionic surface active agent is mixed with a solid organic peroxide at a temperature in the range of 60° C. to 66° C., if the organic peroxide happens to be one which, like di-cetyl peroxydicarbonate or di-decanoyl peroxide, lacks thermal stability, then this method cannot be effectively applied to this organic peroxide because the organic peroxide is liable to be explosively decomposed. Secondly, the aqueous suspension obtained by this method is susceptible of sedimentation or creaming of particles.

As described above, when aqueous suspensions of organic peroxides are produced by such conventional methods, the dispersed particles are not sufficiently fine and, consequently, undergo sedimentation or the like. Thus, the conventional methods have been incapable of producing stable aqueous suspensions.

SUMMARY OF THE INVENTION

The inventors carried out a study in search for aqueous suspensions of solid organic peroxides free from the aforementioned drawbacks. They have consequently found a method for safe manufacture of such aqueous suspensions without the use of any special machine for dispersion and they have further ascertained that aqueous suspensions of solid organic peroxides obtained by this method are stable. This knowledge has led to perfection of this invention.

Of the solid organic peroxides, those which have small differences between their respective melting points and thermal decomposition temperatures are thermally instable so that at times (during emulsification, for example), they abruptly decompose, possibly with an explosion. This invention, therefore, adopts only solid organic peroxides which have a difference of at least 5° C. between the two temperatures mentioned to avoid the danger. Specifically, therefore, this invention relates to a method for the manufacture of an aqueous suspension of a solid organic peroxide, which method comprises mixing a solid organic peroxide having a difference of at least 5° C. between the melting point and the thermal decomposition temperature thereof with a protective colloid, a surface active agent, and water at a temperature higher than the melting point and lower than the thermal decomposition temperature of the solid organic peroxide, thereby forming an aqueous emulsion of the solid organic peroxide, and cooling this aqueous emulsion in its unaltered state.

DESCRIPTION OF THE PREFERRED EMBODIMENTS

Now, the method of the present invention will be described in detail below. First, an aqueous phase obtained by dissolving or dispersing a protective colloid and at least one surface active agent in water is mixed with an organic peroxide having a difference of at least 5° C. between the melting point and the thermal decomposition temperature thereof. The resultant mixture is stirred as kept at a temperature higher than the melting point and lower than the thermal decomposition temperature of the organic peroxide. This stirring is required to be continued for a period enough for the organic peroxide to be thoroughly divided into fine particles.

This period normally does not exceed 20 minutes and is desired to be limited to within 10 minutes. If the period of this stirring is excessively long, there ensues the disadvantage that the organic peroxide, depending on its kind, will be degraded. By the procedure described above, the organic peroxide is dissolved to give rise to an aqueous emulsion of finely divided organic peroxide particles having an average diameter of not more than 30 $\mu$m, preferably not more than 10 $\mu$m.

If the average diameter of the particles exceeds 30 $\mu$m, the particles in the aqueous emulsion are likely to undergo sedimentation or creaming. Especially when the average diameter of the particles is 10 $\mu$m or under, there will be obtained a stable aqueous suspension. In this case, the organic peroxide may be on that has undergone purification but is still in the process of manufacture and it may be immediately treated by the procedure described above.

The aforementioned melting point of the solid organic peroxide does not necessarily mean the melting point of this peroxide all by itself. When the solid organic peroxide is mixed with some other kind of an organic peroxide or it exists in combination with a plasticizer, for example, it may also mean the melting point in such state, which is lower than the melting point of the peroxide alone. As used in the present invention, the melting point embraces both the cases mentioned above. The thermal decomposition temperature is the value determined in accordance with the method of thermal test reported in the magazine "Safety Engineering" (Hiroshi Kitagawa et al: Safety Engineering, Vol. 4, No. 2, pages 133-134 and page 136 (1965)). Specifically, it is defined as the temperature at which a given organic peroxide, when heated at a fixed temperature increasing rate, begins to decompose quickly.

Subsequently, the aqueous emulsion of the organic peroxide is stirred, for example, as kept in its unaltered state, and cooled to the temperature for storage, with the result that an aqueous suspension is obtained. This cooling is continued generally for a period of not more than 30 minutes, preferably not more than 20 minutes. If the rate of cooling is low and the aqueous emulsion remains long in its unaltered state, there ensues the possibility that the organic peroxide will be degraded.

When the aqueous suspension thus obtained shows insufficient stability of suspension, a proper amount of the surface active agent may be added to the aqueous suspension and stirred therein.

The stirring involved in the present invention is carried out by using an ordinary stirrer such as, for example, a mechanically rotated stirrer of the blade type, propeller type, or turbine type. A line mixer or an ultrasonic homogenizer may be used when desired.

The step of emulsification and that of suspension mentioned above may be continuously carried out by using an emulsifying device such as a line mixer, with a cooling device attached thereto.

The solid organic peroxide to be used for the purpose of this invention is required to have a difference of at least 5° C. between the melting point and the thermal decomposition temperature thereof as already described.

Examples of the organic peroxide satisfying this requirement are peroxydicarbonates such as di-isopropyl peroxydicarbonate, di-decyl peroxydicarbonate, di-myristyl peroxydicarbonate, di-cetyl peroxydicarbonate, di-stearyl peroxydicarbonate, bis(4-t-butylcyclohexyl)peroxydicarbonate, dicyclohexyl peroxydicarbonate, and dibenzyl peroxydicarbonate; diacylperoxides such as bis(o-methylbenzoyl) peroxide, bis(m-methylbenzoyl) peroxide, di-decanoyl peroxide, di-lauroyl peroxide, di-myristyl peroxide, and benzoyl peroxide; hydroperoxides such as 2,5-dihydroperoxy-2,5-dimethyl hexane; ester peroxides such as di-t-butylperoxy isophthalate; dialkyl peroxides such as dicumyl peroxide, $\alpha\alpha'$-bis(t-butylperoxy)di-isopropylbenzene, 2,5-dimethyl-2,5-di(t-butylperoxy)-hexyne-3; ketone peroxides such as 1,1'-dihydroxydicyclohexyl peroxide; and acetylcyclohexylsulfonyl peroxide.

Of the organic peroxides mentioned above, those which prove advantageous for the purpose of this invention are peroxy dicarbonates represented by the following general formula (I):

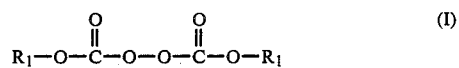

(wherein $R_1$ stands for an aliphatic hydrocarbon group having 3 to 18 carbon atoms) and diacyl peroxides represented by the following general formula (II):

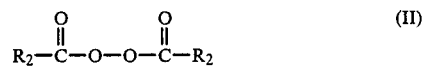

(wherein $R_2$ stands for an aromatic hydrocarbon group or aliphatic hydrocarbon group having 7 to 18 carbon atoms).

Of the organic peroxides represented by the aforementioned general formula (I), those which prove advantageous are di-isopropyl peroxydicarbonate, di-decyl peroxydicarbonate, di-myristyl peroxydicarbonate, and di-cetyl peroxydicarbonate. Of the organic peroxides represented by the aforementioned general formula (II), those which prove advantageous are bis(o-methylbenzoyl) peroxide, bis(m-methylbenzoyl) peroxide, di-cumyl peroxide, di-decanoyl peroxide, and di-lauroyl peroxide.

Typical organic peroxides used in the present invention are enumerated and their respective melting points and thermal decomposition temperatures are compared in the following table.

TABLE

| Organic peroxide | Melting point (°C.) | Thermal decomposition temperature (°C.) |
| --- | --- | --- |
| Di-isopropyl peroxydicarbonate | 8 | 36 |
| Di-decyl peroxydicarbonate | 30 | 72 |
| Di-myristyl peroxydicarbonate | 47 | 83 |
| Di-cetyl peroxydicarbonate | 50 | 78 |
| Bis(o-methylbenzoyl) peroxide | 54 | 70 |
| Bis(m-methylbenzoyl) peroxide | 55 | 77 |
| Di-decanoyl peroxide | 41 | 66 |

TABLE-continued

| Organic peroxide | Melting point (°C.) | Thermal decomposition temperature (°C.) |
|---|---|---|
| Di-lauroyl peroxide | 54 | 74 |
| Acetylcyclohexylsulfonyl peroxide | 36 | 52 |
| 2,5-Dihydroperoxy-2,5-dimethyl hexane | 87 | 102 |
| Di-t-butylperoxy isophthalate | 53 | 116 |
| Di-cumyl peroxide | 39 | 129 |
| 1,1'-Di-hydroxydicyclohexyl peroxide | 68 | 74–86 |

The proportion of the amount of the organic peroxide to that of the aqueous suspension falls generally in the range of 5 to 70% by weight, preferably in the range of 10 to 50% by weight. If this proportion does not reach 5%, the concentration of the organic peroxide is so low as to entail an economic disadvantage since the cost of transportation is high. If the proportion exceeds 70%, the viscosity of the aqueous suspension is so high that the product consequently obtained may not provide ease of handling. Particularly when the proportion falls in the range of 10 to 50%, the aqueous suspension proves advantageous from the standpoint of both economy and physical properties.

Examples of the protective colloid advantageously used for this invention include water-soluble cellulose derivatives such as carboxymethyl cellulose, methyl cellulose, ethyl cellulose, hydroxyethyl cellulose, and hydroxypropylmethyl cellulose, partially or wholly saponified polyvinyl acetate, polyvinyl pyrrolidone, polyacrylic acid, polyacrylic acid amide, copolymers of acrylic acid with acrylic esters, carboxyvinyl polymer, gelatin, starch, and agar. The kind and the amount of the protective colloid are suitably selected, depending on the kind of the organic peroxide used and the visocity which the aqueous suspension is desired to possess. Any member of the group of protective colloids enumerated above may be used either solely or in the form of a mixture with one or more other members selected from the group. The proportion of the amount of the protective colloid to that of the aqueous suspension generally falls in the range of 0.1 to 10% by weight, perferably in the range of 0.2 to 5% by weight.

If this proportion does not reach 0.1%, the aqueous suspension consequently produced does not acquire sufficient stability. If it exceeds 10%, the aqueous suspension acquires too high viscosity. Particularly when this proportion is in the range of 0.2 to 5%, the aqueous suspension consequently obtained enjoys high stability and exhibits desirable viscosity.

The surface active agents which are usable for the purpose of this invention are anionic surface active agents, cationic surface active agents, and nonionic surface active agents. Concrete examples of anionic surface active agents are sodium dodecylbenzenesulfonate, sodium lauryl sulfate, dialkyl esters of sodium sulfosuccinate, sodium salts of fatty acids, and sodium alkylmethyl taurate. Concrete examples of cationic surface active agents are alkylamine hydrochlorides, alkyltrimethyl ammonium chlorides, alkyldimethylbenzyl ammonium chlorides, and polyoxyethylene alkyl amines. Concrete examples of nonionic surface active agents are fatty acid esters of mono-, di-, and tri-sucrose such as sucrose ester of laurylic acid, sucrose ester of palmitic acid, sucrose ester of stearic acid, and sucrose ester of oleic acid, fatty acid esters of mono- and di-sorbitans such as sorbitan ester of lauric acid, sorbitan ester of oleic acid, and sorbitan ester of palmitic acid, glycerin fatty acid ester, propyleneglycol fatty acid ester, polyoxyethylene alkyl ethers, polyoxyethylene alkylphenyl ether, polyoxyethylene polyoxypropylene block polymer, polyoxyethylene sorbitan fatty acid ester, polyoxyethyleneglycerin fatty acid ester, and polyethyleneglycol fatty acid ester. The kind of the aforementioned surface active agent is suitably selected, depending on the organic peroxide to be used. Any member of the group of surface active agents enumerated above may be used solely or in the form of a mixture with one or more other members from the group. The proportion of the amount of the surface active agent to that of the aqueous suspension falls generally in the range of 0.1 to 20% by weight, preferably in the range of 0.2 to 10% by weight.

If this proportion does not reach 0.1%, the aqueous suspension to be produced does not acquire ample stability. If it exceeds 20%, the aqueous suspension proves un-economical. Particularly when this proportion falls in the range of 0.2 to 10%, the produced aqueous suspension enjoys high stability and proves economical.

The aqueous suspension described above is obtained by cooling the aqueous emulsion similarly described above. Thus, the aqueous emulsion and the aqueous suspension have a substantially identical composition. When the aqueous suspension is required to contain its components in stated proportions, therefore, it suffices only to prepare the corresponding aqueous emulsion by mixing such components in stated proportions. The proportion of the amount of water to that of the aqueous suspension is required to fall generally in the range of 10 to 80% by weight, preferably in the range of 30 to 70% by weight.

The solid organic peroxides which are advantageously used for the purpose of this invention have already been described and some of them will be mentioned in the working examples to be cited afterward.

Now protective colloids and the surface active agents with properties preferable for use in the invention from a practical point of view will be described below. Examples of the protective colloid are carboxymethyl cellulose, ethyl cellulose, hydroxyethyl cellulose, and hydroxypropylmethyl cellulose besides saponified polyvinyl acetate and methyl cellulose which are mentioned in the working examples. Examples of the surface active agent are sodium salts of fatty acids, sucrose ester of stearic acid, sorbitan ester of lauric acid, sorbitan ester of oleic acid, sorbitan ester of palmitic acid, glycerin fatty acid ester, propylene glycol fatty acid ester, polyoxyethylenealkyl ethers, polyoxyethylenealkylphenyl ethers, and poloxyethylene sorbitan fatty acid ester besides sucrose ester of lauric acid, hexadecyltrimethyl ammonium chloride, and sodium dodecylbenzenesulfonate which are mentioned in the working examples.

Now the characteristics of the method of this invention will be enumerated below.

(1) The method does not require any special machine with high shearing stress for dispersion.
(2) Since this method produces the aqueous suspension in the presence of water, the heat generated by the decomposition of the organic peroxide is absorbed by the water. Thus, the organic peroxide does not suffer abrupt spontaneous decomposition.
(3) When this method produces the aqueous emulsion of the organic peroxide, since the oil-soluble surface active agent is soluble in the organic peroxide and the water-soluble surface active agent is soluble in the water, all the surface active agent in the system is completely used up.

(4) The aqueous suspension produced by the method of this invention enjoys excellent stability. It can be transported by pumps in much the same way as any conventional aqueous suspension of a solid organic peroxide. Thus, the aqueous solution of this invention is suitable for polymerization or cross-linking of ethylenically unsaturated monomers.

Now, the present invention will be described specifically below with reference to working examples and comparative experiments.

EXAMPLE 1

A flask provided with a thermometer and a mechanical rotary stirrer fitted with two paddle-like vanes was charged with a mixture consisting of 20 parts by weight of di-lauroyl peroxide as an organic peroxide, 2 parts by weight of partially saponified polyvinyl acetate as a protective colloid, 1 part by weight of sucrose ester of laurylic acid as a surface active agent, and 77 parts by weight of water. Then the mixture was stirred at 600 r.p.m. and, at the same time, a bath for heating the flask was heated to 60° C. Within about 5 minutes of the stirring, dilauroyl peroxide was dissolved and the mixture assumed a state of emulsion. On elapse of about 3 minutes thereafter, the mixture in the form of emulsion was cooled to room temperature over a period of about 15 minutes, with the mixture continuously stirred. Consequently, there was obtained a homogeneous, milky white aqueous suspension. This aqueous suspension showed a viscosity of 4 poises at 20° C. and contained particles of an average diameter of about 10 μm. The suspension remained stable without any phase separation for a period of more than one month. The viscosity of the suspension also remained unchanged.

EXAMPLE 2

An aqueous suspension was produced by faithfully following the procedure of Example 1, except that di-decyl peroxydicarbonate was used as an organic peroxide and hexadecyltrimethyl ammonium chloride was used as a surface active agent respectively. This aqueous suspension showed a viscosity of 5 poises at 20° C. and contained particles of an average diameter of about 9 μm. It remained stable without any phase separation for a period of more than one month.

EXAMPLE 3

An aqueous suspension was produced by faithfully following the procedure of Example 1, except that di-t-butylperoxy isophthalate was used as an organic peroxide and sodium dodecylbenzenesulfonate as a surface active agent respectively. This aqueous suspension showed a viscosity of 6 poises at 20° C. and contained particles of an average diameter of about 9 μm. It remained stable without any phase separation over a period of more than one month.

EXAMPLE 4

An aqueous solution was produced by faithfully following the procedure of Example 1, except that di-cumyl peroxide was used as an organic peroxide and methyl cellulose as a protective colloid respectively. This aqueous suspension had a viscosity of 3 poises at 20° C. and contained particles of an average diameter of about 8 μm. It remained stable without any phase separation over a period of more than one month.

EXAMPLE 5

An aqueous suspension was produced by faithfully following the procedure of Example 1, except that 1,1'-dihydroxy-dicyclohexyl peroxide was used as an organic peroxide and the temperature of the bath was elevated to 75° C. This aqueous suspension showed viscosity of 7 poises at 20° C. and contained particles of an average diameter of about 9 μm. It remained stable without any phase separation over a period of more than one month.

EXAMPLE 6

An aqueous suspension was produced by faithfully following the procedure of Example 1, except that 2,5-dihydroperoxy-2,5-dimethyl hexane was used as an organic peroxide and the temperature of the bath was elevated to 95° C. This aqueous suspension showed a viscosity of 4 poises at 20° C. and contained particles of an average diameter of about 8 μm. It remained stable without any phase separation over a period of more than one month.

EXAMPLE 7

An aqueous suspension was produced by faithfully following the procedure of Example 1, except that di-isopropyl peroxydicarbonate was used as an organic peroxide and the temperature of the bath was elevated to 20° C. This aqueous suspension showed a viscosity of 15 poises at 5° C. and contained particles of an average diameter of about 9 μm. It remained stable without any phase separation over a period of more than one month.

EXAMPLE 8

An aqueous suspension was produced by faithfully following the procedure of Example 1, except that o-methylbenzoyl peroxide was used as an organic peroxide. This aqueous suspension showed a viscosity of 10 poises at 20° C. and contained particles of an average diameter of about 7 μm. It remained stable without any phase separation over a period of more than one month.

COMPARATIVE EXPERIMENT 1

Entirely the same mixture as used in Example 1 was treated with a colloid mill (made by Tokushu Kikakogyo) to produce an aqueous suspension. This aqueous suspension showed a viscosity of 3 poises at 20° C. and contained particles of an average diameter of about 50 μm. It induced phase separation within one week of standing.

COMPARATIVE EXPERIMENT 2

A mixture of 20 parts by weight of di-lauroyl peroxide with 3 parts by weight of polyoxyethyleneoctylphenol ether (not containing any water) was dissolved by being immersed in a bath kept at about 60° C. On elapse of about one minute after the dissolution, the temperature of the organic peroxide began to rise abruptly. At this point, therefore, the experiment had to be discontinued.

COMPARATIVE EXPERIMENT 3

A mixture of 20 parts by weight of α,α'-bis-(t-butylperoxy)di-isopropylbenzene (having a melting point of 35° C. and a thermal decomposition temperature of 138° C.) with 3 parts by weight of polyoxyethyleneoctylphenol ether was dissolved by being immersed in a bath kept at about 60° C. After this dissolution, 77 parts by weight of hot water at about 60° C. was added to the dissolved mixture while the mixture was kept stirred at a speed of about 600 r.p.m. Thereafter, the reaction system was cooled to room temperature over a period of about 10 minutes, to afford an aqueous suspension. This aqueous suspension lacked homogeneity because it partially contained an aggregate of particles about 0.5 mm to 1 mm in diameter. It induced perfect phase separation within one week of standing.

COMPARATIVE EXPERIMENT 4

An aqueous suspension was produced by faithfully following the procedure of Example 1, except that benzoyl peroxide (containing 10% of dichlorohexyl maleate and having a melting point of about 100° C. and a thermal decomposition temperature of 104° C.) was used in the place of di-lauroyl peroxide and the temperature of the bath was elevated to 102° C. In the course of this experiment, however, the temperature of the mixture began to rise abruptly after the temperature thereof had reached about 100° C. Thus, the experiment had to be discontinued at this point.

In the aqueous suspensions obtained in the working examples of this invention, the organic peroxides had average particle diameters of not more than 30 μm. The suspensions invariably remained stable without any phase separation over a period of more than one month.

In Comparative Experiment 1, although the mixture had the same composition as that of Example 1, the produced suspension was not stable because the mixture was treated with a colloid mill. Comparative Experiments 2–3 contained no protective colloid in their mixtures and Comparative Experiment 4 used an organic peroxide which had a difference of 2° C. between its melting point and thermal decomposition temperature, thus deviating from the scope of the method of this invention. In Comparative Experiment 3, although the mixture was converted into an aqueous suspension, this suspension was not stable. In Comparative Experiments 2 and 4, the mixtures in the course of conversion into aqueous suspensions induced abrupt rise of temperature and failed to yield suspensions. From the working examples and the comparative experiments cited above, it is noted clearly that the method of the present invention is superior to other methods.

What is claimed is:

1. A method for the manufacture of an aqueous suspension of a solid organic peroxide, characterized by the steps of mixing a solid organic peroxide selected from the group consisting of peroxydicarbonates and diacylperoxides having a difference of at least 5° C. between the melting point and the thermal decomposition temperature thereof, with a protective colloid, a surface active agent, and water at a temperature higher than the melting point and lower than the thermal decomposition temperature of said organic peroxide thereby forming an aqueous emulsion of said organic peroxide and subsequently cooling said aqueous emulsion.

2. A method according to claim 1, wherein said organic peroxide is a peroxy dicarbonate represented by the general formula:

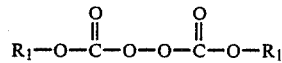

wherein $R_1$ stands for an aliphatic hydrocarbon group having 3 to 18 carbon atoms.

3. A method according to claim 2, wherein said organic peroxide is at least one member selected from the group consisting of di-isopropyl peroxydicarbonate, di-decyl peroxydicarbonate, di-myristyl peroxydicarbonate, and di-cetyl peroxydicarbonate.

4. A method according to claim 1, wherein said organic peroxide is a diacyl peroxide represented by the general formula:

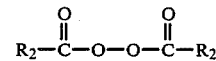

wherein $R_2$ stands for an aromatic hydrocarbon group or aliphatic hydrocarbon group having 7 to 18 carbon atoms.

5. A method according to claim 4, wherein said organic peroxide is at least one member selected from the group consisting of bis(o-methylbenzoyl) peroxide, bis(m-methylbenzoyl) peroxide, di-decanoyl peroxide, and di-lauroyl peroxide.

6. A method according to claim 1, wherein said organic peroxide is at least one member selected from the group consisting of di-t-butylperoxy isophthalate, 1,1'-dihydroxydicyclohexyl peroxide, and 2,5-dihydroperoxy-2,5-dimethyl hexane.

7. A method according to claim 1, wherein said organic peroxide, protective colloid, surface active agent, and water are mixed in respective proportions of 5–70% by weight, 0.1 to 10% by weight, 0.1 to 20% by weight, and 10 to 80% by weight, based on said aqueous emulsion.

8. The method of claim 1 wherein said aqueous suspension comprises solid organic peroxide particles having an average diameter of not more than 30 μm.